April 24, 1962   G. ALFIERI   3,031,234
HAND-OPERATED PNEUMATIC DISTRIBUTOR FOR CONTROL
OF VEHICULAR COMPRESSED-AIR BRAKES
Filed July 22, 1960

INVENTOR:
GIUSEPPE ALFIERI
BY
AGENT

United States Patent Office 3,031,234
Patented Apr. 24, 1962

3,031,234
HAND - OPERATED PNEUMATIC DISTRIBUTOR FOR CONTROL OF VEHICULAR COMPRESSED-AIR BRAKES
Giuseppe Alfieri, Milan, Italy, assignor to Fabbrica Italiana Magneti Marelli S.p.A., Milan, Italy, a corporation of Italy
Filed July 22, 1960, Ser. No. 44,635
Claims priority, application Italy Aug. 7, 1959
8 Claims. (Cl. 303—54)

The present invention deals with a hand-operated pneumatic distributor employed for the operation of vehicular compressed-air brakes, of the type comprising a cylinder subjected to the action of the manually operated element, and a control push rod operating the inlet valve and controlled by the cylinder by means of an adjusting spring.

Distributors of this kind are normally mounted on heavy vehicles for the operation of the auxiliary brake acting on the motor unit and/or a trailer. It is commonly known that control of these distributors is generally effected by a hand-operated element in stable operating position by means of which the auxiliary brake, having been previously actuated, is inactivated only when the vehicle driver brings the operating element from the operating position to the idle position.

Should the driver forget to carry out this movement, pressure continues to act on the braking elements and provokes the operation of the brakes.

In the case of slight braking, the pressure in said braking elements assumes very low values whereby the driver, not being able to notice the very slight braking effect, can continue traveling in a slightly braked condition without being aware of this fact.

In such an event the brake linings as well as all other connected parts continue to be subjected needlessly to utilization and consequent wear. This presence of pressure in the braking elements and resulting wear on the parts is due to the characteristics of the distributor proper which, as is commonly known, functions in such a manner as to cause the closure of the inlet valve each time the fluid pressure in the feed chamber for the braking elements has reached such a value as to displace the operating push rod of the valve to a sufficient extent to allow the return of the latter to its seat.

The object of the present invention is to prove a novel distributor capable of preventing the creation of a pressure lower than a minimum value $p_{min}$ in the operating elements, and in this manner avoiding very low pressures under the aforesaid conditions which could cause the defects mentioned above.

In the distributor which is the subject of the present invention, the regulating spring located between the control cylinder and the push rod is preloaded with a force corresponding to a minimum pressure value $p_{min}$ which is the lowest fluid pressure permitted to exist in the braking elements. For this purpose the mechanism controlling the push rod is so constructed as to be stable only in either its inactive position or a range of off-normal positions in which the full bias force of the loading spring is brought to bear upon the inlet valve.

In accordance with another feature of the invention, the control of the distributor apparatus is accomplished by means of a cam which acts on the closed end of the distributor cylinder.

This end is provided with two plane surfaces joined by a steeply inclined surface whereby the opening of the inlet valve occurs upon a limited angular displacement of the cam and hence of the associated control lever. The cam presents a surface which permits an angular adjustment of the fluid delivery over a wide range and also enables the immobilization of the control lever in any position whatsoever within the effective range whereby the device can be used advantageously for permanent braking without the necessity of continual control by the driver.

An embodiment of a distributor according to the invention is given by way of example with reference to the accompanying drawing in which.

Figure 1:
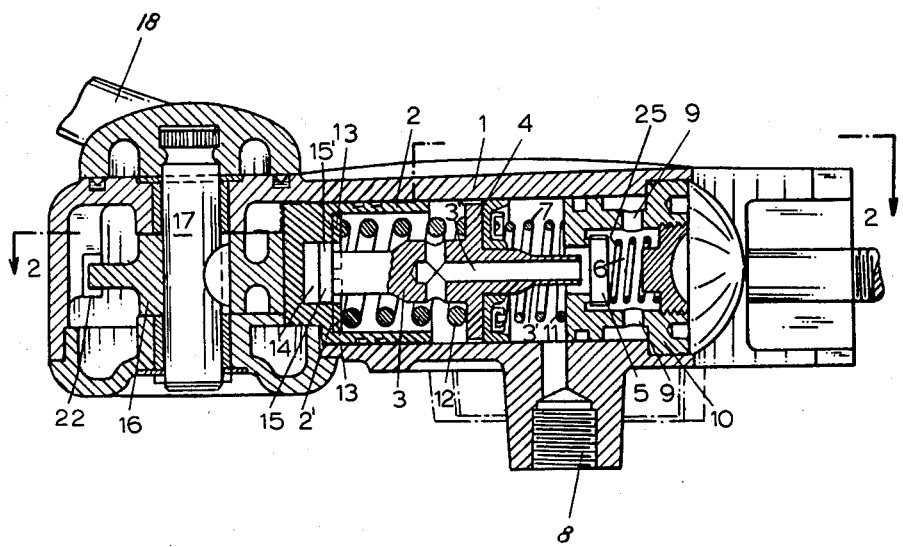
FIG. 1 represents a longitudinal section through the distributor.

Reference numeral 1 indicates the housing of the distributor in which there is located a cup-shaped cylinder 2 controlled by push rod 3. This latter is equipped with a guide flange 4 which forms a piston sliding in air-tight manner in housing 1, and further has an internal channel 3 to allow the fluid-operated brake elements not shown in the drawing to discharge into the atmosphere whenever the system is in the position shown in FIG. 1, i.e. as long as the inner channel 3" of rod 3 is not blocked by the valve body 5 which is yieldably held against its seat by a spring 25.

Extremity 3' of the push rod controls the inlet valve 5 which normally separates the feed chamber 6, connected to the feed source, from chamber 7 communicating by means of port 8 with the controlled braking elements.

Chamber 6 is in communication with the source through a series of holes 9 which together with chamber 6 are located in plug 10 fixed in the interior of housing 1. The return spring 11 is installed between said plug and one side of the flange 4 of the push rod, while the adjusting spring 12 is situated between the other side of the flange and the end plate of control cylinder 2.

According to the invention said spring 12 is so mounted on its seat that, upon operative displacement of cylinder 2 in a manner more fully described hereinafter, it develops an initial bias corresponding to the minimum pressure $p_{min}$ of the fluid which must be maintained in chamber 7 and therefore in the controlled elements connected to said chamber under operating conditions. The bias of the spring is sufficient to avoid the closure of valve 5 by a movement of push rod 3 at pressure values in chamber 7 less than the pre-established $p_{min}$ pressure.

In normal or inactive position the preloaded spring 12 exerts no positive effect on the push rod. For this purpose it rests at one end on the annular shoulder 2' of the cylinder by means of two half rings 13 surrounding and in contact with the push rod. On the left-hand end of cylinder 2 there is located a recess 14 in which terminates the extremity or head 15 of the corresponding side of the push rod.

The head 15 is designed as a plate having a diameter greater than that of the adjacent portion of push rod 3 whereby, in the position shown in FIG. 1, the half rings 13 rest in part against the shoulder 2' of the cylinder and in part against the periphery 15' of head 15.

Cylinder 2 is operated by cam 16 keyed onto pinion 17, the latter being rigidly connected to the control lever 18. Cam 16 comprises a plane surface 16' and a curved surface 19 interconnected by a bevel 19'. The curved surface 19 has a progressively increasing radius so that the extreme point 19" has the maximum distance from the axis of rotation of the cam. The curved surface 19 is so shaped as to render every working position of the cam stable upon contacting the raised step 20 of the cylinder end.

Figure 2:
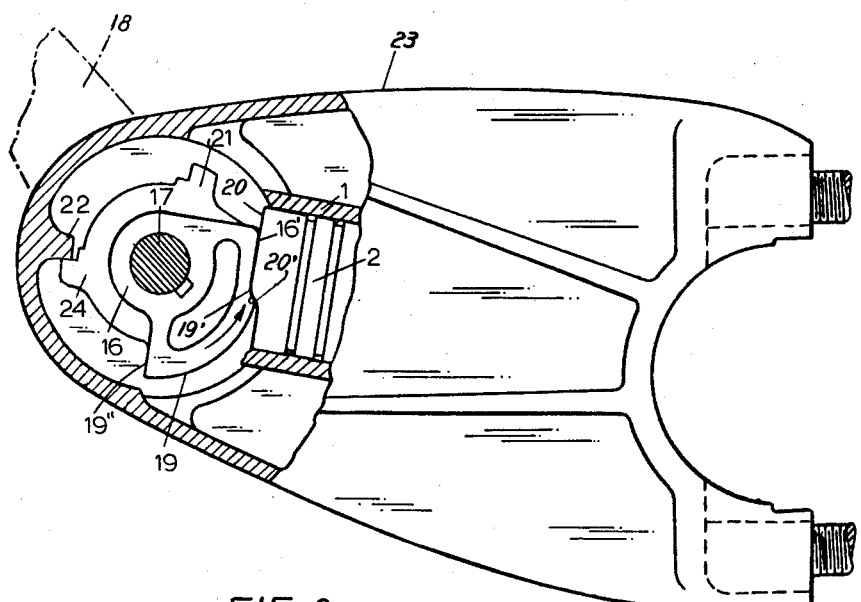
FIG. 2 is a partial axial section taken on the line 2—2.

In its normal position (FIG. 2) the level surface 16' of the cam rests on the step 20 of the cylinder while the bevel 19' of the cam is in contact with the corresponding surface 20' of the cylinder end which is steeply inclined relatively to step 20.

The inclined parts 20' and the curved surface 19 of the cam constitute the active operating surfaces. The rotation of the cam is limited to the angle described by its tooth 21 in its conterclockwise sweep from the position shown in FIG. 2 up to its engagement with stop 22 of casing 23.

Against this stop 22 there also acts a second tooth 24 of the cam which prevents it from rotating in clockwise direction (as viewed in FIG. 2) from its illustrated rest position.

The distributor operates as follows: The rotation of control lever 18 effects a counterclockwise rotation of cam 16 which acts on cylinder 2, thus causing the displacement thereof to the right. At the start of this rotation, the bevel 19' of the cam acts on the inclined surface 20' of the cylinder. In this phase the closure of the distributor outlet occurs rapidly as the end of rod 3 contacts the valve body 5, and the position of the lever 18 in this transition range is unstable with a tendency to return into the rest position.

Subsequently the curved surface 19 of the cam becomes effective; along this surface the radius of the cam increases but slowly; hence the cam and therefore the control lever are held by friction in any desired operating position.

In all of these positions the valve body 5 is lifted off its seat by the force of spring 12 until the back pressure in chamber 7 reaches a value sufficient to restore the valve against the spring action, this pressure being in all instances greater than $p_{min}$. When the spring pressure is overcome, the head 15 of rod 3 is pressed deeper into recess 14 so as to lose contact with the ring segments 13.

Thus, adjusting spring 12 ensures that the inlet valve 5 opens as soon as the delivery pressure of the fluid reaches a value corresponding to the bias of said spring, this bias causing an immediate rise of the pressure in chamber 7 and therefore in the operating units until it reaches the pre-established value of $p_{min}$.

Any further action by the cam on the cylinder of the distributor results in the gradual increase of pressure in chamber 7 as in normal compressed-air distributors.

When the cam 16 is subsequently restored to its normal position (shown in FIG. 2) by a clockwise rotation of handle 18, spring 12 re-expands and causes the ring segments 13 to abut once more the head 15, thereby entraining the rod 3 to the left and enabling the complete discharging of the load lines through the internal venting channel 3 of the push rod and suitable holes located in the distributor housing.

I claim:

1. A distributor for a vehicular fluid-brake system, comprising a housing provided with an inlet port connectable to a source of fluid, an outlet port connectable to a load and a fluid chamber communicating with said outlet port, piston means forming a boundary of said chamber, a valve body separating in a normal position said chamber from said inlet port, restoring means tending to maintain said valve body in said normal position, spring means bearing upon said piston means, pusher means rigid with said piston means and displaceable by the force of said spring means against said valve body for establishing communication between said chamber and said inlet port, said pusher means forming a venting channel normally connecting said chamber with the exterior of said housing but adapted to be blocked upon contact of said pusher means with said valve body, and mechanism for progressively stressing said spring means in a sense urging said pusher means against said valve body whereby said pusher means can hold said valve body in off-normal position against increasing back pressures in said chamber; said mechanism including an operating member with a stable inactive position, a plurality of stable operative positions corresponding to progressively higher back pressures, and an unstable transition range between said inactive position and the first of said operative positions, said spring means tending to return said operating member to said inactive position from said transition range, said spring means having sufficient stress in any of said operative positions to overcome the force of said restoring means in the absence of a predetermined minimum back pressure, thereby maintaining communication between said inlet port and said chamber.

2. A distributor according to claim 1 wherein said mechanism comprises a rotatable cam with a flat peripheral surface, a curved peripheral surface with progressively increasing radius, and a sharply beveled transition surface interconnecting said peripheral surfaces.

3. A distributor according to claim 1 wherein said mechanism further comprises a cup-shaped element having an end surface engaged by said cam, said spring means including a compression spring partly received in said element.

4. A distributor according to claim 3 wherein said end surface has two steps interconnected by an inclination complementary to said beveled transition surface.

5. A distributor according to claim 1 wherein said mechanism further includes a spring-engaging element provided with abutment means engaging said piston means in said inactive position for withdrawing said pusher means from said valve body.

6. A distributor according to claim 5 wherein said element is a cylinder provided with an internal shoulder, said spring means including a compression spring partly received in said element and bearing upon said shoulder, said piston means having a head surrounded by said shoulder, said abutment means extending from said shoulder inwardly toward said head.

7. A distributor according to claim 6 wherein said abutment means comprises an insert clamped between said shoulder and said spring.

8. A distributor according to claim 7 wherein said insert consists of a pair of ring segments.

References Cited in the file of this patent

UNITED STATES PATENTS

| | | |
|---|---|---|
| 1,650,063 | Christensen | Nov. 22, 1927 |
| 1,721,349 | Mitton | July 16, 1929 |
| 1,814,565 | Lombard | July 14, 1931 |
| 2,381,222 | May | Aug, 7, 1945 |
| 2,854,289 | Schnell | Sept. 30, 1958 |